C. W. CRAWFORD.
VEHICLE SPRING.
APPLICATION FILED MAY 7, 1914.
1,130,380. Patented Mar. 2, 1915.
2 SHEETS—SHEET 1.
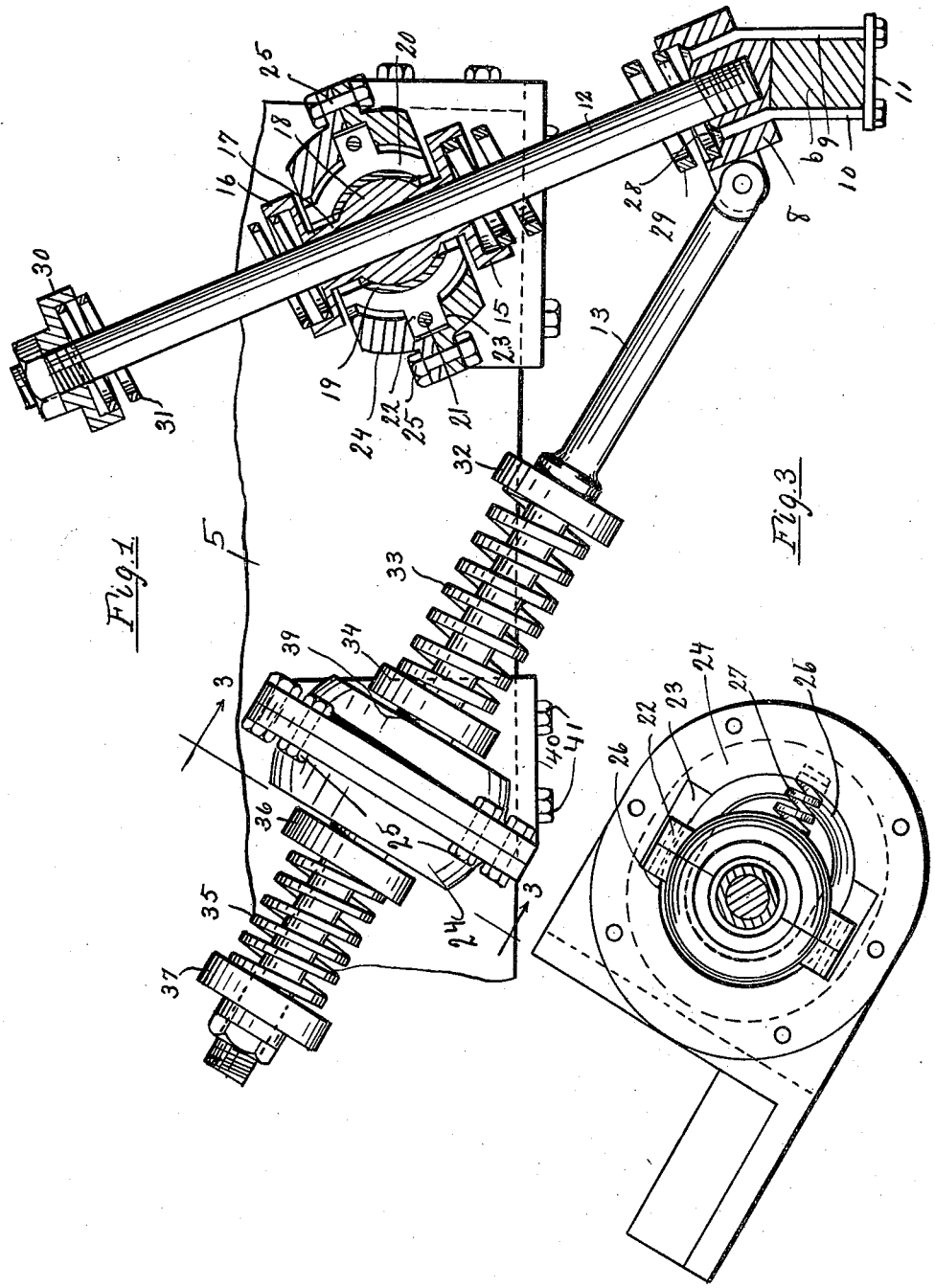

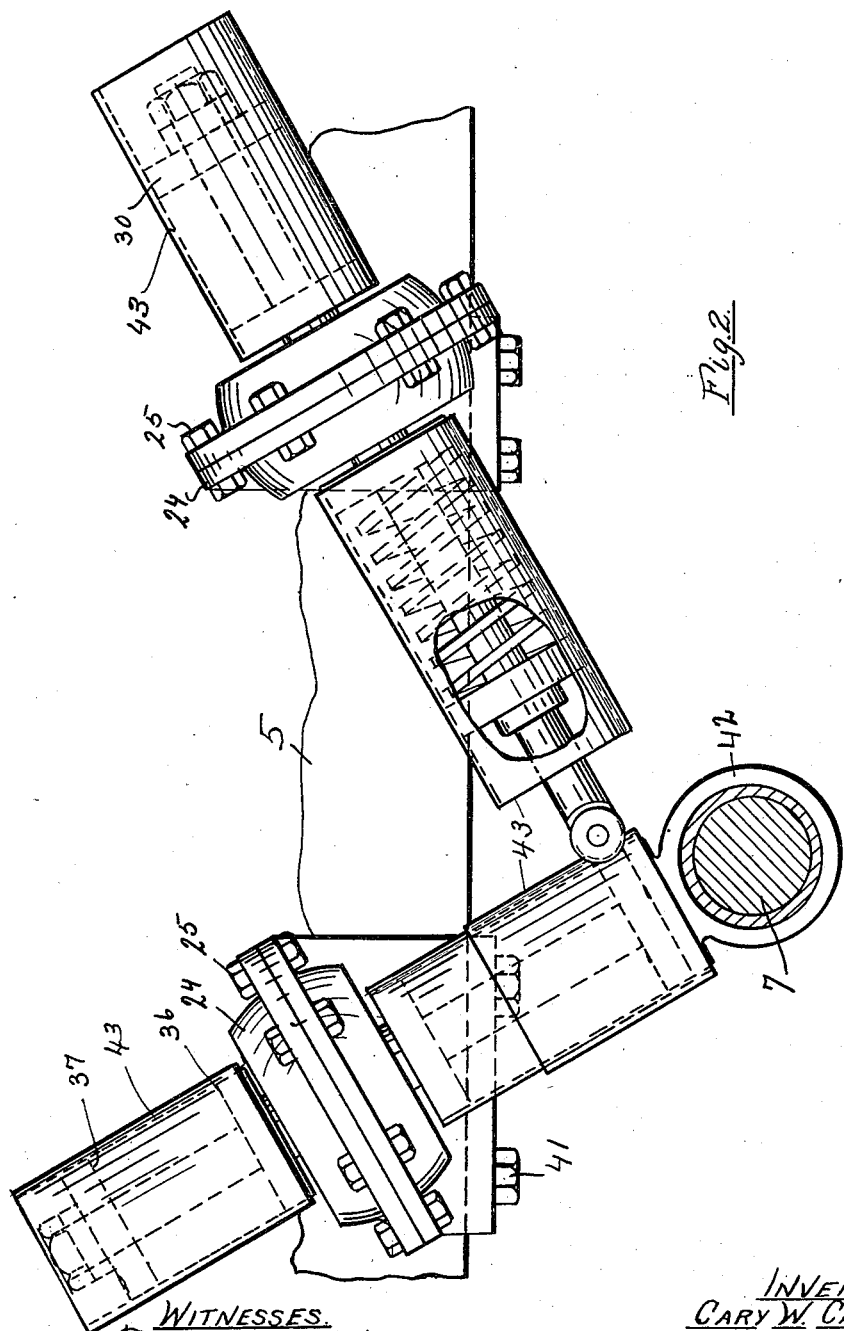

UNITED STATES PATENT OFFICE.

CARY W. CRAWFORD, OF LOS ANGELES, CALIFORNIA, ASSIGNOR TO EUREKA SHOCK ABSORBER COMPANY, OF LOS ANGELES, CALIFORNIA, A CORPORATION OF CALIFORNIA.

VEHICLE-SPRING.

1,130,380.

Specification of Letters Patent.

Patented Mar. 2, 1915.

Application filed May 7, 1914. Serial No. 836,912.

*To all whom it may concern:*

Be it known that I, CARY W. CRAWFORD, a citizen of the United States, residing at the city of Los Angeles, in the county of Los Angeles and State of California, have invented new and useful Improvements in Vehicle-Springs, of which the following is a specification.

My invention relates to springs for vehicles which travel over roads and carry passengers and the object thereof is to provide springs for resisting the jar caused by passing over obstructions or into ruts and other springs that prevent an objectionable recoil, said springs being so arranged and mounted that they will yield in any direction to accommodate the body to any unevenness in the road. I accomplish these objects by the mechanism described herein and illustrated in the accompanying drawings forming a part of this application in which:

Figure 1 is a side elevation partly in section of one of the pair of springs at the front end of the vehicle with a fragment of the body of the vehicle. Fig. 2 is a like view of a pair of springs at the rear end of the vehicle. Fig. 3 is a section on the line 3—3 of Fig. 1.

In the drawings 5 is the body of the vehicle and 6 and 7 are the front and rear axle respectively thereof of any desired construction. At or near each corner of the body of the vehicle are the vehicle springs which are in mountings connected to the body and to the axles. I will first describe the springs at the front of the body at one side thereof. The other side is similar and needs no separate description.

Upon the front axle I secure a bearing plate 8 by means of bolts 9 and 10 and clip 11. In this plate are mounted the front spring bolt 12 and the rear spring bolt 13 which extend upwardly and rearwardly at different angles as shown in Fig. 1. These bolts pass through spring mountings of the same construction, one of which is shown in section to consist of end cups 15 and 16 which are connected by a tubular body 17 the central portion of which has a spherical shaped enlargement 18. This body makes a bearing member for the bolts which pass therethrough. Exterior the spherical enlargement is a babbitt lining 19 for socket 20 which is in shape the central segment of a hollow sphere. Socket 20 is formed in halves which are united by screws 21 and is preferably divided on a plane taken on nearly a vertical line. At each side of socket 20 are lugs or ears 22 (see Fig. 3) which extend into guideways 23 in casing 24. Casing 24 consists of two halves united on a plane at right angles to the plane of the dividing plane or socket 20 by bolts 25. In casing 24 is a chamber 26 which is elliptical. In this chamber socket 20 is received. The ends of the openings through casing 24 are elliptical in the direction transverse to the body to permit the bearing members to turn to a limited extent. A spring 27 bears against socket 20 and against the outer wall of chamber 26 and normally holds the socket 20 against the inner wall of chamber 26 as best shown in Fig. 3. When a wheel strikes an obstruction or drops into a rut spring 27 permits the socket to move outwardly or away from the body of the vehicle. A ball and socket connection between bolts 12 and 13 and plate 8 can be made if desired. Casing 24 is bolted or otherwise securd to the chassis or body. In plate 8 surrounding bolt 12 is a cup 28 and a compression spring 29 is coiled around bolt 12 with its ends resting in cups 28 and 15. On the outer end of bolt 12 is secured a cup 30 and a compression spring 31 is coiled around bolt 12 with its ends resting in cups 30 and 16. Spring 29 is the shock spring and spring 31 is the rebound spring. Bolt 13 is pivotally connected to plate 8 and has secured to it above such connection a cup 32. A spring 33 is coiled around bolt 13 with one end resting in cup 32 and the other resting in cup 34. A spring 35 is coiled around bolt 13 with one end resting in cup 36 and the other in cup 37. Cups 34 and 36 are connected by a tubular body 39 which has a central enlargement like the enlargement 18 of body 17. Around this enlargement is a babbitt lining. A socket having ears surrounds the lining and is inclosed in a casing 40 which is bolted by bolts 41 or otherwise secured to the chassis or body. Casing 40 has a chamber therein like chamber 26 and a spring like spring 27 is mounted therein for a like purpose. On the rear axle are mounted clips, one on each side, of the same construction. In Fig. 2 one of these clips 42 is shown. To these clips are secured bolts on which are mounted springs in the same manner as the springs of bolts 12 and 13 and they pass through casings of the same construction as the casings through which bolts 12 and 13 pass and within these casings are the same kind of parts similarly constructed and for like purposes as are the parts shown in the casings through which pass bolts 12 and 13.

In the operation of a vehicle equipped with my improved springs, should a wheel strike an obstruction or drop into a rut the compression springs of that wheel would yield, the rods passing through the casings on that corner would move through the bearings and the sockets would turn to accommodate themselves to the required movement. The rebound springs would prevent any objectionable recoil. By the peculiar arrangement of springs at each corner of the body of the vehicle the jar caused by a wheel passing over an obstruction or into a rut is reduced to the minimum. The peculiar formation of bearings through which the bolts pass and the sockets and casing with chambers therein permit of a limited amount of motion between the body and running gear with a minimum amount of friction. In the drawings I have shown the front rods of the front wheels projecting rearwardly and upwardly but if desired they could be set perpendicularly. In Fig. 2 I have shown the springs inclosed by casings 43 of fiber or other suitable material but they can be omitted if desired to save expense but I prefer them as they protect the springs from dirt and the weather.

Having described my invention what I claim is:

1. In a vehicle means to connect the body and running gear comprising casings connected to the body of the vehicle at or near the corners thereof, said casings having chambers therein; sockets revoluble in said chambers; bearing members passing through said sockets, said bearing members having enlargements in said sockets; rods passing through said bearing members, said rods being secured to the running gear; and springs mounted on said rods at each side of said casings.

2. In a vehicle means to connect the body and running gear comprising casings connected to the body of the vehicle at or near the corners thereof, said casings having elliptical spherical chambers therein and elliptical circular openings at the ends thereof; sockets in said chambers, said sockets being in shape the segment of a hollow sphere; springs mounted in said chambers between the sockets and the outer walls thereof; tubular bearing members passing through said sockets, said bearing members having spherical enlargements within said sockets; rods passing through said bearing members, said rods being connected to the running gear; and springs mounted on said rods at each side of said bearing members.

3. In a vehicle means to connect the body and running gear comprising a pair of rods at or near each corner of the body, said rods being connected to the running gear and set angularly to each other; casings connected to the body of the vehicle at each corner thereof through which said rods pass; compression springs on said rods between the running gear and casings; and rebound springs on the outer ends of said rods.

4. In a vehicle means to connect the body and running gear comprising a pair of casings secured to the body at or near each corner thereof, said casings having chambers therein; rods secured to the running gear in pairs and passing through said casings; bearing members surrounding said rods, said bearing members passing through said casings and having spherical enlargements within said casings; means for permitting said bearing members to move circularly in a direction longitudinally to the vehicle body within said casings and to move circularly and longitudinally in a transverse direction to the body; and springs on said rods at both sides of said bearing members.

In witness that I claim the foregoing I have hereunto subscribed my name this 18th day of April, 1914.

CARY W. CRAWFORD.

Witnesses:
LYANCY LEWIS,
G. R. WOODBURN.

Copies of this patent may be obtained for five cents each, by addressing the "Commissioner of Patents, Washington, D. C."